(12) United States Patent
Mizukami

(10) Patent No.: US 8,203,076 B2
(45) Date of Patent: Jun. 19, 2012

(54) ELECTRICAL JUNCTION BOX

(75) Inventor: Shunsuke Mizukami, Yokkaichi (JP)

(73) Assignee: Sumitomo Wiring Systems, Ltd., Mie (JP)

( * ) Notice: Subject to any disclaimer, the term of this patent is extended or adjusted under 35 U.S.C. 154(b) by 225 days.

(21) Appl. No.: 12/662,395

(22) Filed: Apr. 14, 2010

(65) Prior Publication Data

US 2010/0270051 A1 Oct. 28, 2010

(30) Foreign Application Priority Data

Apr. 28, 2009 (JP) ................. 2009-109910

(51) Int. Cl.
*H02G 3/08* (2006.01)

(52) U.S. Cl. .......... 174/50; 439/535; 280/847; 180/69.1
(58) Field of Classification Search ................ 174/50; 439/535; 220/4.02; 280/847; 180/69.1
See application file for complete search history.

(56) References Cited

U.S. PATENT DOCUMENTS

| 6,581,708 | B2 * | 6/2003 | Lawrence et al. | 180/69.1 |
| 7,232,590 | B2 | 6/2007 | Leonard | |
| 7,717,467 | B2 * | 5/2010 | Iverson | 280/847 |

FOREIGN PATENT DOCUMENTS

| JP | A-9-19031 | 1/1997 |
| JP | A-2000-316217 | 11/2000 |
| JP | A-2001-314013 | 11/2001 |
| JP | A-2007-68377 | 3/2007 |

* cited by examiner

*Primary Examiner* — Dhirubhai R Patel
(74) *Attorney, Agent, or Firm* — Oliff & Berridge, PLC

(57) ABSTRACT

To provide an electrical junction box having a novelty structure that may be detachably attached with a sufficient fixing force to a place where a bolt-fastening work may be in a difficult condition. An attaching projection may be provided with an abutting portion to be superimposed on a front surface of a vehicle body panel. An engagement projection protrudes from the abutting portion in a slanting position in a superimposing direction to the vehicle body panel. The engagement projection may be inserted into an attaching hole provided in the vehicle body panel so that the engagement projection may be engaged with a peripheral edge portion around the attaching hole at a rear surface of the vehicle body panel.

5 Claims, 7 Drawing Sheets

[Fig. 1]
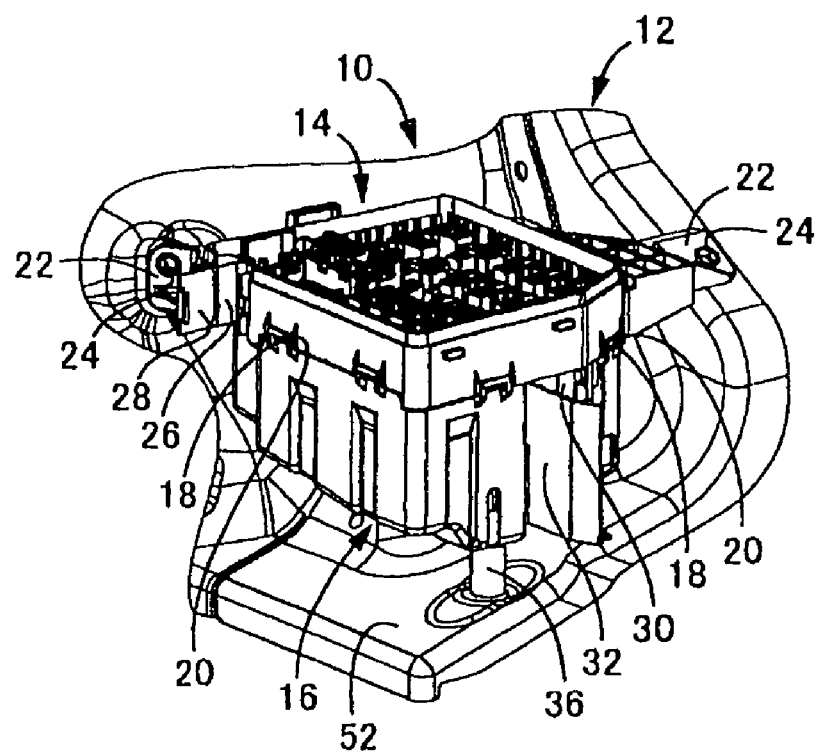

[Fig. 2]
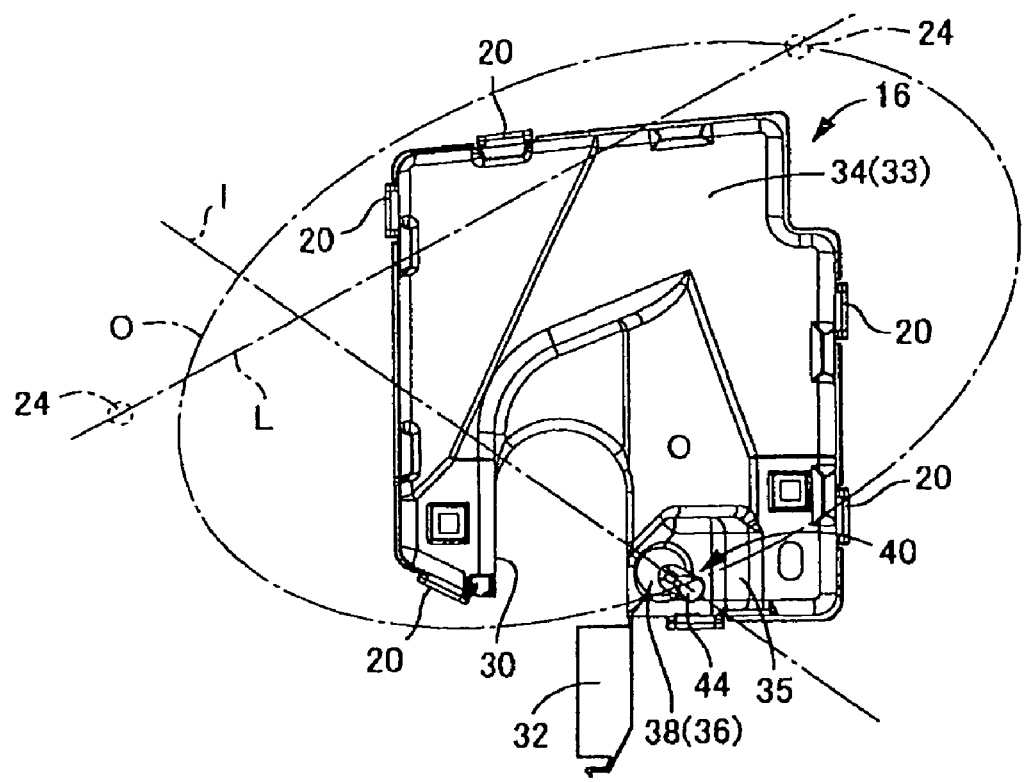

[Fig. 3]
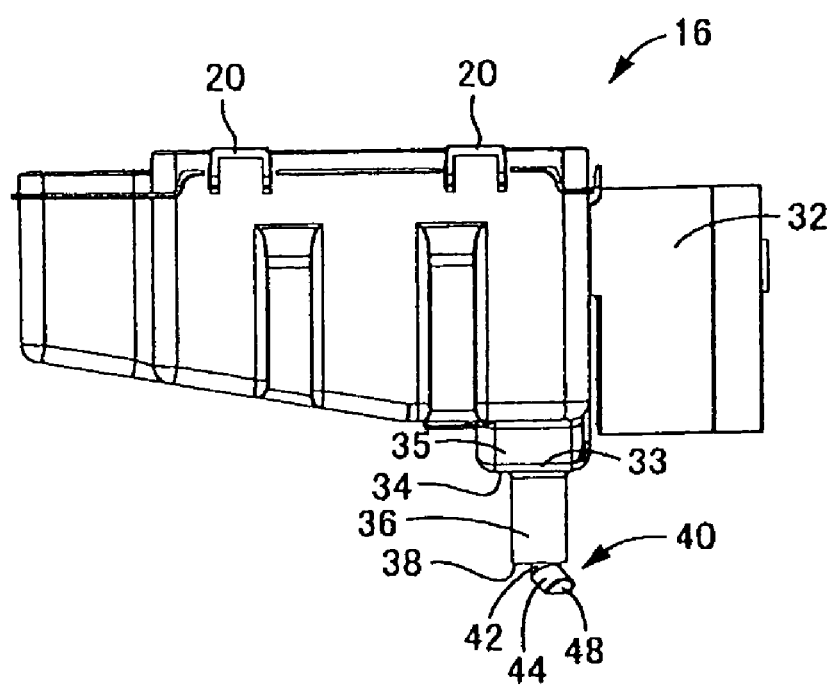

[Fig. 4]
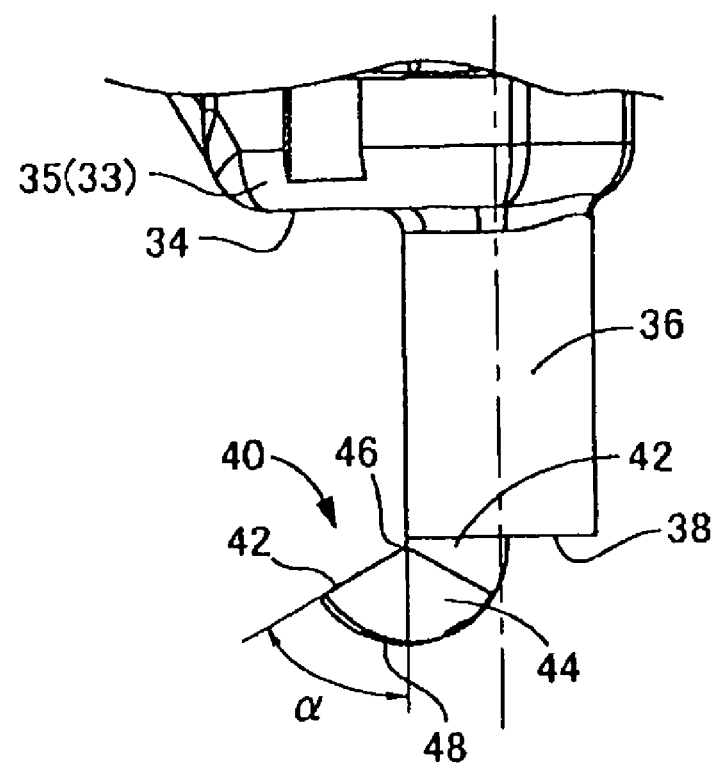

[Fig. 5]
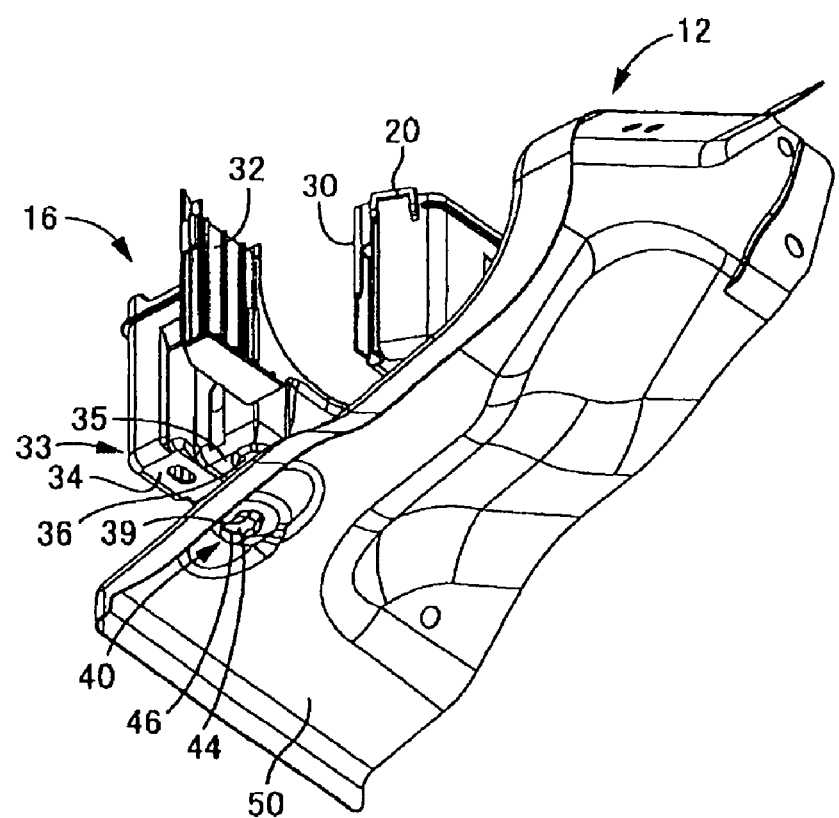

[Fig. 6]
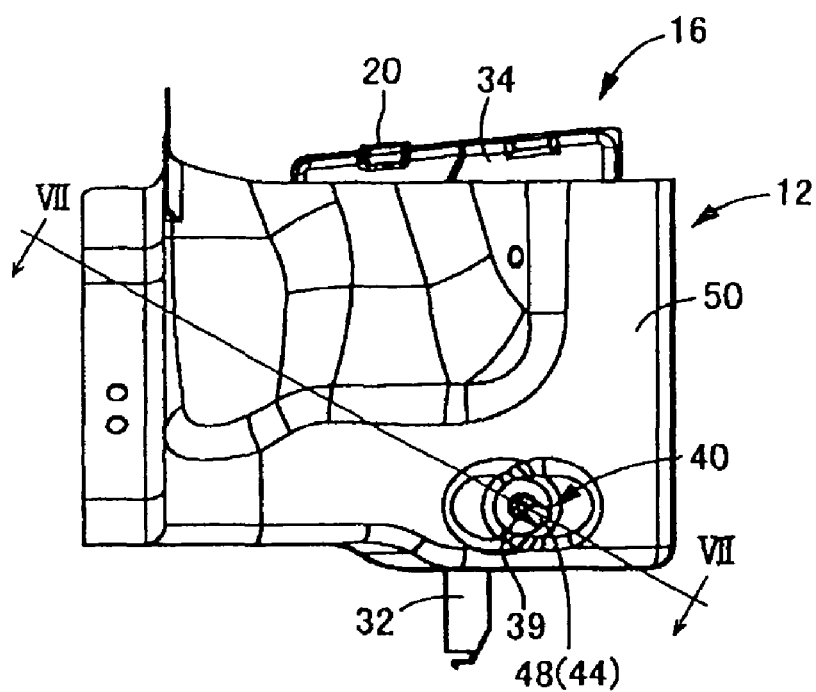

[Fig. 7]
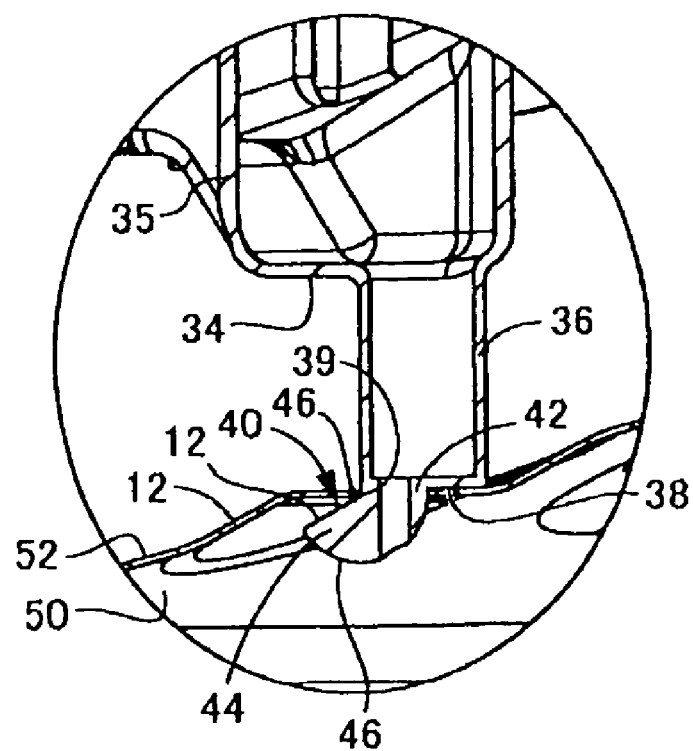

ELECTRICAL JUNCTION BOX

CROSS-REFERENCE TO RELATED APPLICATIONS

This application claims priority to JP 2009-109910 filed in Japan on Apr. 28, 2009, the entire disclosure of which is hereby incorporated by reference in its entirety.

BACKGROUND

The exemplary embodiments relate to an electrical junction box to be attached to a vehicle body panel at a plurality of fixing positions.

An electrical junction box such as a relay box, a fuse box, or a junction block is mounted on and fixed to a vehicle body panel provided on a vehicle body.

Heretofore, many fixing methods for an electrical junction box have adopted a bolt-fastening manner as disclosed in JP 2007-68377. Generally, the bolt-fastening manner provides more than three attaching portions on the electrical junction box and superimposes and fastens the three attaching portions on the vehicle body panel.

However, there are many vehicle body panels that have complicated configurations in accordance with shapes of arrangement spaces or the like. In the case where it is difficult to obtain a sufficient area for superimposing the electrical junction box on the vehicle body panel, there was a problem that the bolt-fastening manner cannot obtain a sufficient fixing force. Further, there was a problem that the bolt-fastening manner cannot be applied to a place where a tool such as a driver is hard of access.

There will be a possibility that a resin lock as disclosed in JP 2000-316217 A and JP HEI 9 (1997)-19031 A can be adopted in lieu of the bolt-fastening manner. According to the resin lock, an attaching portion made of a resin material can be secured to the vehicle body panel merely by inserting the attaching portion into an attaching hole in the vehicle body panel. However, because the resin lock would be bound on the vehicle body panel, the resin lock will be difficult to maintain. Accordingly, the resin lock is not suitable for a fixing method of an electrical junction box.

SUMMARY

To address the above and other problems, a novel electrical junction box may be detachably attached with a sufficient fixing force where it may otherwise be difficult to obtain a sufficient area for superimposing the electrical junction box, or other difficult condition.

In an exemplary embodiment of the present invention, an electrical junction box may be attached to a vehicle body panel. The electrical junction box may include an abutting projection provided with an abutting portion to be superimposed on a front surface of the vehicle body panel; an engagement projection that protrudes from the abutting portion in a slanting position in a superimposing direction to the vehicle body panel. The engagement projection being inserted into an attaching hole provided in the vehicle body panel so that the engagement projection is engaged with a peripheral edge portion around the attaching hole at a rear surface of the vehicle body panel.

According to the exemplary embodiments, it is possible to prevent the electrical junction box from moving toward the vehicle body panel by pinching front and rear surfaces of the vehicle body panel between the abutting portion and the engagement projection, since the abutting portion may be pushed onto the front surface of the vehicle body panel, even if vibrations or the like cause the electrical junction box to move toward the vehicle body panel. On the other hand, it is possible to prevent the electrical junction box from moving apart from the vehicle body panel, since the engagement projection latches the rear surface of the vehicle body panel, even if the vibrations or the like cause the electrical junction box to move apart from the vehicle body panel. Thus, it is possible to stably position and hold the electrical junction box on the vehicle body panel. Particularly, it is possible to obtain a stable fixing force even on a place where a superimposing area on the vehicle body panel hardly obtains, since the engagement projection exerts the fixing force by engagement with the vehicle body panel against displacement of the electrical junction box apart from the vehicle body panel.

It is possible to rapidly fix the electrical junction box to the vehicle body panel merely by inserting the engagement projection into the attaching hole. Since any tools are not required for fixing the electrical junction box to vehicle body panel, it is possible to readily define the fixing points on a place where there is no sufficient space of a place where a tool is hard of access. Consequently, it is possible to enhance flexibility in arrangement of the fixing points and it is also possible to easily form the fixing points on optimum positions in view of fixing balance. In addition, since it is possible to release the fixing condition by drawing the engagement projection out of the attaching hole without causing breakage or deformation in the engagement projection, fixing and releasing operations can be carried out repeatedly and maintenance can be enhanced.

The exemplary embodiments can adopt a construction in which an outer peripheral surface of the engagement projection has an arcuate cross section at a side opposed to the rear surface of the vehicle body panel and engaged with a peripheral edge portion around the attaching hole.

According to the above construction, it is possible to reduce an accident of catching the outer peripheral surface of the engagement projection by the attaching hole and it is possible to smoothly insert the engagement projection into the attaching hole. Further, it is possible to latch the engagement projection at any position on the arcuate line along the peripheral edge portion around the attaching hole, thereby obtaining a stable engagement force. The arcuate cross section of the engagement projection can give leeway for moving the electrical junction box to the vehicle body panel. In comparison with a straight line cross section of the engagement projection, the arcuate cross section can move freely in front and rear directions and right and left directions and can comply with a moment in a slant direction or a turning direction, thereby enhancing workability in attaching. The arcuate cross section may not be limited to a precise circular and may be an ellipse shape or a curved shape in accordance with a shape of the peripheral portion around the attaching hole.

Further, the exemplary embodiments can adopt a construction in which an apex of a proximal end of the engagement projection may be disposed on an outer peripheral surface of the abutting portion at the side engaged with the peripheral edge portion around the attaching hole.

According to the exemplary embodiments, the edge line portion of the outer peripheral surface of the engagement projection may be connected to the outer peripheral surface of the abutting portion without interposing the superimposing surface of the abutting portion onto the vehicle body panel. Thus, it may be possible to absorb an error of a dimension in thickness of the vehicle body panel, thereby obtaining a stable fixing force. That is, in the case where the apex of the engagement projection at the side engaged with the peripheral edge portion around the attaching hole may be disposed on the superimposing surface of the abutting portion onto the vehicle body panel and in the case where the peripheral edge portion around the attaching hole, in which the engagement projection is latched, is pinched by the superimposing surface of the abutting portion from the front surface side, there is a problem that a pinching action between the engagement projection and the abutting portion becomes unstable on account of unevenness in thickness of the vehicle body panel. On the contrary, according to the exemplary embodiments, since the superimposing surface of the abutting portion may not be disposed on a part of the engagement projection to be engaged with the attaching hole, it may be possible to absorb an error of a dimension in thickness of the vehicle body panel.

Since the attaching projection is provided on the electrical junction box in the exemplary embodiments so that the attaching projection protrudes from a box bottom surface opposed to the vehicle body panel toward the panel and the projecting distal end surface of the attaching projection is superimposed on the vehicle body panel, the attaching projection constitutes the abutting portion and the engagement projection protrudes from the projecting distal end surface of the attaching projection.

According to the exemplary embodiments, even if the electrical junction box body is spaced apart from the vehicle body panel, it is possible to secure the electrical junction box to the vehicle body panel by adjusting a length of the attaching projection. A detailed shape of the attaching projection is not limited. The attaching projection may extend with a constant cross section or a changing cross section in a projecting direction, or may be bent at an intermediate portion in the projecting direction.

According to the exemplary embodiments the engagement projection may protrude toward an outer peripheral side of an annular imaginary line connecting a plurality of fixing points of an electrical junction box body onto the vehicle body panel. When the electrical junction box is attached to the vehicle body panel, and the electrical junction box body is inclined, the engagement projection may be inserted into the attaching hole in a substantially vertical position. Then, the electrical junction box body may be turned about the proximal end portion of the engagement projection, and a plurality of fixing points are superimposed on the corresponding positions on the vehicle body panel. According to the above construction, when the engagement projection is inserted into the attaching hole while tilting the electrical junction box body, it may be possible to incline the electrical junction box in a spacing direction apart from the vehicle body panel, thereby reducing a problem that the box body is caught by the vehicle body panel. When turning the electrical junction box body, it may be possible to superimpose the fixing points of the electrical junction box on the corresponding positions on the vehicle body panel so as to cover the fixing points, thereby facilitating to attach the electrical junction box to the vehicle body panel.

According to exemplary embodiments, a slant angle of the engagement portion in the projecting direction may be set to be 1° (one degree) to 80° (eighty degrees), more preferably 20° to 70°, most preferably 30° to 60° with respect to the superimposing direction of abutting portion onto the vehicle body panel. Accordingly, it may be possible to obtain a stable engagement force while facilitating a fixing work. That is, if the slant angle is smaller than 1° (one degree), it may be difficult to obtain an engagement force around the attaching hole 39, since the contact angle of the engagement projection with the peripheral portion around the attaching hole becomes too shallow. On the other hand, if the slant angle is greater than 80°, a fixing work may be under a difficult condition, since the electrical junction box body must be inclined significantly in order to insert the engagement projection into the attaching hole.

Further, according to the exemplary embodiments the engagement projection may be integrated with the electrical junction box body. Accordingly, it may be possible to effectively obtain fixing strength of the engagement projection onto the vehicle body panel, thereby efficiently producing the electrical junction box provided with the engagement projection and lowering a cost in production.

BRIEF DESCRIPTION OF THE FIGURES

FIG. 1 is a perspective view of an electrical junction box in an embodiment of the present invention, illustrating a position of the electrical junction box attached to a vehicle body panel;

FIG. 2 is a bottom plan view of a lower cover that constitutes the electrical junction box shown in FIG. 1;

FIG. 3 is a side elevation view of the lower cover in FIG. 1;

FIG. 4 is a partial side elevation view of an abutting portion and an engagement projection of the lower cover in an exemplary embodiment;

FIG. 5 is an enlarged perspective view of a main part of the lower cover taken from a rear side of the vehicle body panel, illustrating a position of the lower cover attached to the vehicle body panel in an exemplary embodiment;

FIG. 6 is a bottom plan view of FIG. 5; and

FIG. 7 is an enlarged sectional view of a main part of the lower cover taken along lines VII-VII in FIG. 6.

DETAILED DESCRIPTION OF EMBODIMENTS

Referring now to the drawings, exemplary embodiments of an electrical junction box in accordance with the exemplary embodiments will be described below in more detail.

FIG. 1 is a perspective view of an embodiment of a relay box 10 as an electrical junction box, illustrating a position of the relay box 10 attached to a vehicle body panel 12. A main body of the relay box 10 may be formed into a substantially rectangular parallelopiped configuration made of, for example, a synthetic resin material and includes a body casing 14, a lower cover 16, and an upper cover (not shown). The body casing 14 may be provided on an outer surface with a plurality of lock pawls 18. The lock pawls 18 may engage lock arms 20 provided on the lower cover 16 at positions corresponding to the lock pawls 18, thereby securing the lower cover 16 to the body casing 14. The electrical junction box may include not only a relay box but also a junction box, a fuse box, or the like known boxes or later developed structures for attachment to a panel.

The body casing 14 may have a plurality of bolt-securing pieces 22 (for example, two pieces, as shown in FIG. 1) that protrude outward. Each bolt-securing piece 22 may be provided with a bolt-receiving hole 24. Each bolt-receiving hole 24 may be superimposed on each bolt hole in a vehicle body panel 12. The body casing 14 may be secured to the vehicle body panel 12 by inserting bolts into the bolt-receiving holes 24 and bolt holes. The body casing 14 may be disposed on an outer peripheral portion defining a containing recess 26. The containing recess 26 can be closed by a cover portion 28, which may be integrated with the body casing 14 through a thin hinge portion. Wire harnesses (not shown) or the like may be accommodated in the containing recess 26. The cover portion 28 may constitute a part of an outer peripheral surface of the body casing 14 when the cover portion 28 is disposed in a closing position on the containing recess 26. The respective drawings show the cover portion 28 in an open position.

FIGS. 2 and 3 show the lower cover 16. The lower cover 16 may be formed into a substantially box-like configuration that is open at one side (at an upper side in FIG. 3). The lower cover 16 may be disposed at an outer peripheral portion with a containing recess 30 and a cover portion 32, as is the case with the containing recess 26 and the cover portion 28 of the body casing 14. The respective drawings show the cover portion 32 in an open position.

The lower cover 16 may be provided on a bottom surface 34 of a bottom wall 33 with an attaching projection 36 that may be orthogonal to a spreading direction (right and left directions in FIG. 3) and may protrude outward from the lower cover 16. The attaching projection 36 may be formed into a substantially right circular cylinder. An outer diametrical dimension of a projecting distal end surface 38 that serves as an abutting portion may be set to be greater than a diametrical dimension of the attaching hole 39 (see FIGS. 5 to 7) provided in the vehicle body panel 12. The bottom wall 33 may be integrally provided with a base-like projection 35 that protrudes outward from the bottom wall 33. The attaching projection 36 may protrude from the base-like projection 35. As shown in FIG. 2, the attaching projection 36 may be disposed at an apex of a triangle defined by two bolt-receiving holes 24 in the outer peripheral portion of the body casing 14 and a point on the outer peripheral portion of the relay box 10. Although the attaching projection 36 can be formed into a hollow configuration in order to reduce a weight and a cost in production, the attaching projection 36 may be formed into a solid configuration in order to obtain high strength.

An engagement projection 40 may be integrated with the projecting distal end surface 38. As shown in FIG. 4, the engagement projection 40 may include a proximal end portion 42 that protrudes slightly from the projection distal end surface 38 in the same direction as the projecting direction of the attaching projection 36, and a slant engagement portion 44 that protrudes obliquely from a projecting distal end of the proximal end portion 42.

The proximal end portion 42 may protrude slightly from the projecting distal end surface 38 in the same direction as the extending direction of the attaching projection 36 while maintaining a substantially constant circular cross section. A diametrical dimension of the circular cross section of the proximal end portion 42 may be substantially equal to a diametrical dimension of the attaching hole 39 so that the proximal end portion 42 may pass the attaching hole 39. As described after, the engagement projection 40 may have a substantially constant diametrical dimension over a whole length thereof. Preferably, the diametrical dimension of the engagement projection 40 may be set to be the substantially same as an outer diameter of a bolt that may be used to fix the bolt-securing piece 22 to the vehicle body panel 12. Thus, it may be possible to form the attaching hole 39 by the same working manner of the other bolt-securing holes. Preferably, a projecting dimension of the proximal end portion 42 may be set to be the substantially same as a thickness dimension of the vehicle body panel 12.

The slant engagement portion 44 may protrude obliquely from the projecting distal end of the proximal end portion 42. An apex portion at a diametrical outside of the attaching projection 36 in a connecting portion between the proximal end portion 42 and the slant engagement portion 44 may be set to be a bending point 46. The slant engagement portion 44 may protrude obliquely in a direction of superimposing the relay box 10 onto the vehicle body panel 12 (in upper and lower directions in FIG. 4). As shown in FIG. 2, the projecting direction of the slant engagement portion 44 may be directed to an outer peripheral side of an annular imaginary line O that interconnects the attaching projection 36 with two bolt-receiving holes 24 that define securing points for fixing the relay box 10 on the vehicle body panel 12 and may be substantially set to be a direction perpendicular to a line 1 that extends in a projecting direction of the slant engagement portion 44.

A slant angle α of the slant engagement portion 44 with respect to the superimposing direction (upper and lower directions in FIG. 4) of the relay box 10 onto the vehicle body panel 12 may be set to be 1° (one degree)≦α≦80° (eighty degrees), more preferably 20°≦α≦70°, most preferably 30°≦α≦60°. In the present embodiment, the slant angle α may be set to be 60° (sixty degrees). If the slant angle α is smaller than 1° (one degree), it may be difficult to obtain an engagement force around the attaching hole 39. On the other hand, if the slant angle α is greater than 80° (eighty degrees), a main body of the relay box 10 may be inclined too much to make to perform an attaching work, when inserting the slant engagement portion 44 into the attaching hole 39.

Further, a cross section orthogonal to the projecting direction of the slant engagement portion 44 may be substantially the same as that of the proximal end portion 42 and may be formed into the same circular cross section as the circular attaching hole 39. The slant engagement portion 44 may be provided on an outer peripheral surface opposite from the bending point 46 with an arcuate surface 48 that has a substantially constant radius of curvature from the projecting distal end to the proximal end portion 42 and that may be convex at a side opposite from the bending point 46. The slant engagement portion 44 may be tapered at the projecting distal end. A surface opposite from the bending point 46 may be curved at a connecting portion to the proximal end portion 42.

In addition, the engagement projecting portion 40 may be deviated from a center of the projecting distal end surface 38. The circular cross section of the proximal end portion 42 inscribes the projecting distal end surface 38 in an axial direction of the projecting distal end surface 38. Thus, an edge line portion in the proximal end portion 42 of the engagement projection 40 including the bending point 46 is engaged with the peripheral edge portion of the attaching hole 39. The edge line portion may be connected to the attaching projection 36 without interposing the projecting distal end surface 38.

These body casing 14 and lower cover 16 are interconnected to each other to form the relay box 10. The relay box 10 may be attached to a plate-like panel 12 fixed on a vehicle body in, for example, an engine room. The relay box 10 may be attached to the vehicle body panel 12 by the following steps. Firstly, the relay box 10 may be tilted so that the projecting direction of the engagement projection 40 is aligned with an axis of the attaching hole 39, and then the projecting distal end of the engagement projection 40 may be inserted into the attaching hole 39 in the projecting direction of the engagement projection 40. Since the projecting direction of the engagement projection 40 may be set to be at an outer peripheral side of the annular imaginary line connecting the two bolt-receiving holes 24, in the case where the relay box is tilted so that the projecting direction of the engagement projection 40 is aligned with the axis of the attaching hole 39, the main body of the relay box 10 may be separated from the vehicle body panel 12. Consequently, a possibility that the vehicle body panel 12 catches the relay box 10 can be reduced. Further, since the engagement projection 40 may be tapered, the engagement projection 40 may be easily inserted into the attaching hole 39.

The engagement projection 40 may be inserted into the attaching hole 39 after the engagement projection 40 is latched at the bending point 46. The engagement projection 40 protrudes from a rear surface 50 (see FIGS. 5 to 7) of the vehicle body panel 12. Then, the relay box 10 may be turned about the bending point 46 and the projecting distal end surface 38 of the attaching projection 36 may be superimposed on a front surface 52 of the vehicle body panel 12. At this time, the bending point 46 may be disposed on the outer peripheral surface of the attaching projection 36, and the outer peripheral surfaces of the engagement projection 40 and attaching projection 36 are continued on the edge line including the bending point 46. Consequently, when turning the relay box 10, a possibility that the vehicle body panel 12 catches the relay box 19 can be reduced. Further, since the surface of the engagement projection 40 opposite from the bending point 46 may be formed into the arcuate surface 48 along a turning trajectory, it may be possible to carry out the turning operation more smoothly.

Since the bottom surface 34 of the lower cover 16 may be opposed to the front surface 52 of the vehicle body panel 12, the attaching projection 36 protrudes from the bottom surface 34 toward the vehicle body panel 12 and the projecting distal end surface 38 may be superimposed on the front surface 52 of the vehicle body panel 12. At the same time, as shown in FIGS. 5 to 7, the engagement projection 40 protrudes through the attaching hole 39 toward the rear surface 50 of the vehicle body panel 12. The outer peripheral surface at the side of the bending point 46 may be opposed to the rear surface 50 and may be engaged with the peripheral edge around the attaching hole 39 from the rear surface 50. Thus, the vehicle body panel 12 may be pinched between the projecting distal end surface 38 and the engagement projection 40, and the lower cover 16 may be fixed on the vehicle body panel 12 through the engagement projection 40 and the attaching projection 36.

As shown in FIG. 7, the vehicle body panel 12 may be tilted with respect to the bottom surface 34 at the peripheral portion around the attaching hole 39 and may be formed into a stepped configuration so that the projecting distal end surface 38 can be superimposed on an area around the attaching hole 39. Thus, the engagement projection 40 can follow a slant rear surface 50 with the engagement projection 40 protruding toward the rear surface of the vehicle body panel 12.

The two bolt-securing pieces 22 are superimposed on the vehicle body panel 12 by the turning operation, and the respective bolt-receiving holes 24 are superimposed on the bolt holes in the vehicle body panel 12. The relay box 10 may be finally secured to the vehicle body panel 12 by fixing the bolt-securing pieces 22 through the bolt-receiving holes 24 to the vehicle body panel 12.

As described above, the relay box 10 may be fixed to the vehicle body panel 12 at three positions including the bolts inserted into the two bolt-receiving holes 24 and an engagement structure having a combination of the engagement projection 40 and attaching projection 36.

When the relay box 10 constructed above is attached to the vehicle body panel 12, it may be possible to prevent the projecting distal end surface 38 from moving toward the vehicle body panel 12, since the projecting distal end surface 38 may be pushed onto the front surface 52 of the vehicle body panel 12, even if vibrations or the like cause the relay box 10 to move toward the vehicle body panel 12. On the other hand, it may be possible to prevent the relay box 10 from moving away from the vehicle body panel 12, since the engagement projection 40 latches the peripheral edge portion around the attaching hole 39 from the rear surface of the vehicle body panel 12, even if the vibrations or the like cause the relay box 10 to move away from the vehicle body panel 12. Thus, it may be possible to prevent the relay box 10 from moving toward and away from the vehicle body panel 12. Accordingly, it may be possible to stably position and hold the relay box 10 on the vehicle body panel 12. Particularly, it may be possible to effectively obtain strength of the attaching projection 36, since the projecting direction of the attaching projection 36 accords with the superimposing direction of the relay box 10 onto the vehicle body panel 12.

Since a fixing force may be exerted by a combination of a resistance force of pushing the attaching projection 36 onto the vehicle body panel 12 and an engagement force of the engagement projection 40 with the vehicle body panel 12, it may be possible to define the fixing points having smaller spaces than a bolt-fixing manner or the like. Since any tools are not required for attaching and detaching the relay box 10 to and from the vehicle body panel 12, it may be possible to readily define the fixing points on a place where there may be no sufficient space or a place where a tool may be difficult to access. Also, it may be possible to easily define the fixing points at optimum positions in view of fixing balance. Further, since the outer peripheral surface of the engagement projection 40 may be formed into the circular cross section and accords with the peripheral edge portion around the attaching hole, it may be possible to smoothly insert the engagement projection 40 into the attaching hole 39. Also, it may be possible to obtain a stable engagement condition, since the engagement projection 40 can engage the wide area around the attaching hole 39.

As described above, the attaching projection 36 and engagement projection 40 are very readily secured to the vehicle body panel 12 merely by inserting the engagement projection 40 into the attaching hole 39. It may be possible to enhance efficiency in work of attaching the relay box 10 to the vehicle body panel 12. Further, when the relay box 10 is detached from the vehicle body panel 12, the engagement projection 40 may be merely drawn out of the vehicle body panel 12. Accordingly, it may be possible to facilitate a detaching work of the relay box 10. Since the attaching projection 36 and engagement projection 40 are not subject to breakage or deformation upon attaching or detaching the relay box 10 to or from the vehicle body panel 12, it may be possible to repeatedly attach or detach the relay box 10 to or from the vehicle body panel 12 and to enhance maintenance.

An exemplary embodiment of the present invention has been described above. It should be noted that the above exemplary embodiment is merely an example and the present invention is not limited to the detailed embodiment. For example, the attaching projection 36 and engagement projection 40 are not always integrated with the lower cover 16. They may be integrated with the body casing 14. Alternatively, only the engagement projection 40 may be separated from the body casing 14 or the lower cover 16, or the attaching projection 36 including the engagement projection 40 may be separated from the body casing 14 or the lower cover 16.

Detailed configurations of the engagement projection may be altered in view of a configuration of the vehicle body panel for mounting the relay box or required fixing strength. For example, the cross section orthogonal to the extending direction may be selected from any configuration such as an ellipse, or a rectangle. The engagement projection may not be tapered but straightened with a constant cross section over a whole length. Further, a slant angle or a slant direction of the engagement projection may be set suitably. Although the edge line portion including the bending point 46 of the engagement projection 40 may be continued to the outer peripheral surface of the attaching projection 36 without interposing the projecting distal end surface 38 in the above embodiment, for example, the engagement projection 40 may be disposed on a central area of the projecting distal end surface 38, and the bending point 46 may be disposed on the projecting distal end surface 38. Further, although the proximal end portion 42 may be provided in view of the thickness of the vehicle body panel 12, the proximal end portion 42 may not always be necessary.

The attaching projection may not always be necessary. For example, an engagement projection may protrude directly from a bottom surface of the lower casing. The cross section of the attaching projection may be any shape, such as an ellipse or a rectangle. Further, the attaching projection may have a cross section that increases or changes gradually toward the vehicle body panel. Further, the attaching projection may not extend over the whole length in a certain direction. The attaching projection may be bent in accordance with a configuration of the vehicle body panel.

The engagement structure including the abutting portion and the engagement projection may be used on a plurality of fixing positions. In such case, it may be preferable that bolt-securing structures remain on some of the plural bolt-fixing positions in order to facilitate the work of attaching or detaching the relay box to or from the vehicle body panel.

What is claimed is:

1. An electrical junction box to be attached to a vehicle body panel having a rear surface, a front surface and an attaching hole having a peripheral edge portion, the electrical junction box comprising:
    an abutting portion of an attaching projection, which is configured to abut the attaching hole, to be superimposed on the front surface of said vehicle body panel;
    an engagement projection, which is configured to engage with the peripheral edge portion of the attaching hole, that protrudes from said abutting portion in a slanting position in a superimposing direction to said vehicle body panel, and is inserted into the attaching hole of the vehicle body panel so that the engagement projection is engaged with the peripheral edge portion around the attaching hole at the rear surface of the vehicle body panel.

2. An electrical junction box according to claim 1, the engagement projection having an outer peripheral surface positioned at the rear surface side of the vehicle body panel and engaged with a peripheral edge portion around the attaching hole, and the outer peripheral surface having an arcuate cross section.

3. An electrical junction box according to claim 2, the abutting portion having an outer peripheral surface, and the engagement projection having an apex on a proximal end thereof, at the side engaged with the peripheral edge portion around the attaching hole, and the apex is positioned on the outer peripheral surface of the abutting portion.

4. An electrical junction box according to claim 3, comprising:
    an electrical junction box body having a plurality of fixing points that facilitate attachment of the electrical junction box to the vehicle body panel; and
    an annular imaginary line connecting the plurality of fixing points, the annular imaginary line having an outer peripheral side, wherein the engagement projection protrudes toward the outer peripheral side of the annular imaginary line.

5. An electrical junction box according to claim 4, wherein the engagement projection is integrally formed with the electrical junction box body.

* * * * *